UNITED STATES PATENT OFFICE.

FRANK MELBOURNE MOONEY, OF MONTREAL, QUEBEC, CANADA.

PROCESS FOR THE CONVERSION OF CHROMATE AND BICHROMATE OF SODIUM AND POTASSIUM TO CHROMIC OXID AND SULFATE.

1,330,131. Specification of Letters Patent. Patented Feb. 10, 1920.

No Drawing. Application filed April 21, 1919. Serial No. 291,491.

*To all whom it may concern:*

Be it known that I, FRANK MELBOURNE MOONEY, a subject of the King of Great Britain, and residing at 102 Chomedy street, in the city and district of Montreal, in the Province of Quebec, in the Dominion of Canada, have invented a new and useful Process for the Conversion of Chromate and Bichromate of Sodium and Potassium to Chromic Oxid and Sulfate, of which the following is the specification.

The invention relates to a process for the conversion of chromate and bichromate of sodium and potassium to chromic oxid and sulfate, as more particularly described hereinafter and pointed out in the claim for novelty.

The invention consists essentially of the novel steps taken toward the union of known chemical substances, whereby the action is accelerated by heat bringing forth a result specifically set forth by equation in the following description in detail.

The objects of the invention are to eliminate certain chemical substances used in many known processes of conversion and to economize in the use of materials utilized to obtain the chromium sulfate in its purest form; to maintain the weight and durability of leather treated by chromium sulfate by removing those agents in the tanning liquor, which tend to reduce the gelatin of a hide; to facilitate the manufactures concerned in the use of this substance by producing a richer and more effective article as a result of the treatment; and generally to provide a liquor free from deleterious influences in its actions on other products, and comparatively cheap to make.

In the manufacture of this product, the chromates or bichromates of potassium or sodium are first changed to chromium trioxid in any well known or approved manner by the use of sulfuric or other acids, then to two molecules of chromium trioxid, I add one molecule of sodium thiosulfate and heat sufficiently to expel the sulfur dioxid formed.

I then leach and filter to remove the sodium or potassium salts formed. This done, I boil the precipitate with three molecules of sulfuric acid, thereby forming chromium sulfate.

To those versed in the art, the following equation represents the final chemical action:

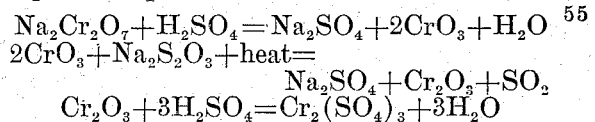

$$Na_2Cr_2O_7 + H_2SO_4 = Na_2SO_4 + 2CrO_3 + H_2O$$
$$2CrO_3 + Na_2S_2O_3 + heat =$$
$$Na_2SO_4 + Cr_2O_3 + SO_2$$
$$Cr_2O_3 + 3H_2SO_4 = Cr_2(SO_4)_3 + 3H_2O$$

The process which I claim is novel is the reduction of chromium trioxid to chromium sesquioxid and the consequent precipitation accelerated by heat. The sesquioxid is not completely precipitated unless heated to expel the sulfur dioxid. The solution is leached and the potassium and sodium salts can then be removed by filtration, and the precipitated sesquioxid of chromium boiled with the requisite molecular proportions of sulfuric acid to form chromium sulfate, which is freed from the potassium and sodium salts.

In the above described process, I also claim a large saving in time, labor and cost of material over the well known process of first converting a chromate or bichromate to the sulfate, then precipitating in a well known manner to form a hydrate, filtering, removing the sodium or potassium salts and finally converting back to the sulfate.

What I claim is:—

The process as herein described comprising making a solution of chromium trioxid and sodium thiosulfate in the proportion of two molecules of chromium trioxid and slightly in excess of one molecule of sodium thiosulfate, then leaching and filtering and finally adding three molecules of sulfuric acid to the precipitate.

Signed at the city of Montreal, Quebec, Canada, this 17th day of April, 1919.

FRANK MELBOURNE MOONEY.